(12) United States Patent
Lopez et al.

(10) Patent No.: US 9,431,149 B2
(45) Date of Patent: Aug. 30, 2016

(54) DEVICE FOR REDUCING THE CORONA EFFECT

(75) Inventors: Albert Rodriguez Lopez, Sant Esteve Sesrovires (ES); Josep Sanllehi Muñoz, Sant Esteve Sesrovires (ES); Said Lalaouna, Sant Esteve Sesrovires (ES); Joan Hernandez Guiteras, Sant Esteve Sesrovires (ES); Jordi Roger Riba Ruiz, Sant Esteve Sesrovires (ES)

(73) Assignee: SBI CONNECTORS ESPANA, S.A., Sant Esteve Sesrovires (ES)

( * ) Notice: Subject to any disclaimer, the term of this patent is extended or adjusted under 35 U.S.C. 154(b) by 220 days.

(21) Appl. No.: 14/344,385

(22) PCT Filed: Jun. 21, 2012

(86) PCT No.: PCT/ES2012/070462
§ 371 (c)(1),
(2), (4) Date: Jun. 11, 2014

(87) PCT Pub. No.: WO2013/038040
PCT Pub. Date: Mar. 21, 2013

(65) Prior Publication Data
US 2014/0345908 A1    Nov. 27, 2014

(30) Foreign Application Priority Data

Sep. 12, 2011 (ES) .................................. 201131484

(51) Int. Cl.
*H01B 5/00* (2006.01)
*H02G 7/00* (2006.01)

(52) U.S. Cl.
CPC ................ *H01B 5/004* (2013.01); *H02G 7/00* (2013.01)

(58) Field of Classification Search
CPC .......... H02G 7/053; H02G 7/00; H02G 1/02; H02G 3/263; H02G 3/30; H01B 5/006; H01B 11/007; H01B 17/02

USPC ...... 174/40 R, 42, 127, 128, 129 R, 130, 135
See application file for complete search history.

(56) References Cited

U.S. PATENT DOCUMENTS

| | | | | |
|---|---|---|---|---|
| 1,664,100 | A | 3/1928 | Austin | |
| 1,691,329 | A * | 11/1928 | Austin | H02G 7/14 174/127 |
| 1,744,353 | A * | 1/1930 | Austin | H02G 7/00 174/45 R |
| 1,999,273 | A * | 4/1935 | Austin | H01B 5/104 174/127 |
| 3,007,243 | A * | 11/1961 | Peterson | D07B 5/005 139/154 |
| 3,217,091 | A * | 11/1965 | Walker | H02G 15/068 174/19 |
| 3,749,816 | A * | 7/1973 | Shaw | H02G 15/113 174/70 R |
| 3,825,671 | A * | 7/1974 | Pokorny | H01B 5/004 174/127 |
| 4,605,814 | A * | 8/1986 | Gillem | H01Q 1/50 174/2 |
| 5,932,838 | A * | 8/1999 | Carpenter, Jr. | H02G 13/00 174/2 |
| 7,142,171 | B1 * | 11/2006 | Patel | H01Q 9/27 343/895 |
| 2005/0146832 | A1 | 7/2005 | D'Alessandro | |

FOREIGN PATENT DOCUMENTS

| | | |
|---|---|---|
| FR | 2 874 284 A1 | 2/2006 |
| GB | 1 510 469 A | 5/1978 |
| WO | 2011/009482 A1 | 1/2011 |

OTHER PUBLICATIONS

Spanish Search Report for ES 201131484, dated Sep. 6, 2013.

* cited by examiner

*Primary Examiner* — William H Mayo, III
(74) *Attorney, Agent, or Firm* — Sughrue Mion, PLLC

(57) ABSTRACT

A device in connection with the corona effect, which is applicable in particular to connection nodes between conductor tubes of a power substation, and which includes an electrically conductive primary filamentous element wound onto itself forming an enveloping figure.

16 Claims, 6 Drawing Sheets

DEVICE FOR REDUCING THE CORONA EFFECT

CROSS REFERENCE TO RELATED APPLICATIONS

This application is a National Stage of International Application No. PCT/ES2012/070462 filed Jun. 21, 2012, claiming priority based on Spanish Patent Application No. 201131484 filed Sep. 12, 2011, the contents of all of which are incorporated herein by reference in their entirety.

TECHNICAL FIELD OF THE INVENTION

The invention relates to a device for minimising corona effect, particularly suitable for its assembly on a point between the electrical conductors of an electrical sub-station.

BACKGROUND OF THE INVENTION

Corona effect is an electrical phenomenon occurring in conductors which transport high voltage electric currents and appearing around the conductors in the form of a light halo which can sometimes be seen by the human eye. Given that conductors tend to have a circular section, the halo adopts a corona shape, hence the name of the phenomenon.

Corona effect is caused by ionisation of air surrounding the conductor due to the high voltage levels of the line. When the air molecules are ionised, they are capable of conducting electric current and part of the electrons flowing through the line will flow through the air. Such flow will cause a temperature increase in the gas which will turn reddish for low temperature levels, or bluish for high levels.

In the scope of the art, the voltage at which the field on the surface of the conductor exceeds the dielectric strength of the air and the corona effect begins is called disruptive critical voltage; and that greater than the disruptive critical voltage from which the corona effect is visible is called visual critical voltage.

Power loss caused by the electrical discharge from the conductors into the air in the installations is a direct consequence of this effect. Another particularly significant consequence is material deterioration, increasing the maintenance cost of the installations.

It is known that in the components of an installation subjected to high electrical voltage, such as the suspension or securing points of the aerial conductors, also called buses in an electrical sub-station, when these have surfaces which are not perfectly smooth or have pointed areas or edge, the corona effect acquires unacceptable levels.

The problems associated with these electrical discharges in the components of a conversion plant or sub-station are conventionally solved by means of using an anti-corona shield the purpose of which is to redistribute the electromagnetic field lines around the components through a surface with relatively high curvature, particularly close to the critical regions including edges or pointed areas.

These curved surfaces are formed by thin sheets of aluminium or other conducting materials with different shapes and which in pairs form, when they are assembled, closed toroidal- or spherical-shaped bodies or semi-open bodies having spherical cap shape or the like.

Sometimes stamping techniques are not suitable to provide the starting sheets with the required shapes and more so when smooth finishes without recesses or protrusions altering the desired curve shape are required, and the use of moulds and stamping is thus resorted to, the manufacturing costs becoming significantly more expensive.

The objective of the present invention is to disclose an alternative to the known anti-corona shields forming bodies partially or completely surrounding the components of the installation from one or several metal sheets.

Patent document WO2011/009482 describes a toroid-shaped shield as a possible solution for reducing costs. This solution consists of using an array of elongate tubular elements placed parallel to each another and attached to each other by means of annular structural elements they form a torus-like body but the walls of which are not continuous but are discrete or broken.

This construction allows lightening material, reducing costs and weight, however it is not satisfactory from the electrical behaviour viewpoint because the field lines are not satisfactorily redistributed largely due to the fact that outer surface of the shield is not continuous. To overcome this drawback a joint solution is proposed, combining the elongate tubular elements with metal sheets to form a surface which is a continuous surface in some sections and a discrete or broken surface in other sections.

Another objective of the present invention is a device for minimising corona effect which, in the line with that proposed in WO2011/009482, allows reducing the use of material but improving the performance thereof, inasmuch as the distribution of the current lines and the use of metal sheets which entails an additional cost in obtaining complex curved shapes or shapes of revolution.

DISCLOSURE OF THE INVENTION

The device according to the invention solves the aforementioned problems and is particularly applicable to the connection points between conductor tubes of an electrical sub-station. In essence the device is characterised in that it comprises an electrically conductive primary filiform element wound upon itself forming the surrounding figure intended for partially surrounding or housing the component of the installation to be protected.

According to one embodiment, a main section of the primary filiform element is spirally wound around a straight axis forming a helix.

In one variant, the mentioned main section of the primary filiform element has in plan view a uniform or Archimedean spiral shape in which the distance to the straight axis varies proportionally to the rotated angle, forming a semispherical or a spherical cap-shaped helix.

According to another optional feature of this variant, the primary filiform element comprises a straight end section coinciding with the straight axis of rotation of the spiral, providing the device with a shape similar to an umbrella.

According to another variant, the main section comprises a first cylindrical helix segment of diameter D; a second cylindrical helix segment of diameter d housed inside the helix formed by the first segment; and a linking segment shaped like a semispherical helix of diameter D, fulfilling the relation D>d.

According to another variant, the helix is inscribed in a body of revolution with curved generatrix G of constant radius R.

According to a feature of this variant the primary filiform element comprises respective straight end sections, prolonging in one and the same direction parallel to the straight axis.

According to another embodiment, a main section of the primary filiform element is spirally wound around a curved axis forming a toroidal helix.

In one variant, the main section comprises two end segments shaped like a semispherical helix.

According to another feature of the invention, the device comprises one or more secondary structural filiform elements shorter than the primary filiform element and arranged transverse to the main direction of the mentioned primary filiform element for keeping the passage of the winding constant.

DETAILED DESCRIPTION OF THE INVENTION

All the variants of the invention explained below have in common the fact that they are basically formed by an electrically conductive primary filiform element 10 which is wound upon itself to form a three-dimensional geometric figure, intended for surrounding at least partially for example a connection point or a connector of conductor bars or another type of conductors in general. The size of the geometric figure will depend of the dimensions of the component of the installation itself susceptible to causing a corona effect and around which the device of the invention should be assembled or installed, for example by means of welded rods or other attachment means which are known and which do not affect the essence of the invention.

By way of example, the primary filiform element can be an aluminium element of approximately 15 mm in diameter.

The same reference numbers have been used in all the depicted variants to designate the same components and especially to highlight the mentioned primary filiform element 10 and a main section thereof, designated with the reference number 11, which is the one wound to basically form a helix with different shapes.

The devices 1 thus obtained are lighter than the devices manufactured from a sheet of conducting material and they are also simpler to manufacture. Advantageously, its use further allows the visual inspection of the components which are located inside the device 1 or which are partially surrounded by same, facilitating the supervising and maintenance tasks, which was not possible by using devices the enveloping casing or surface of which is continuous.

It is also worth mentioning that it has been proven that one of the parameters favouring the appearance of corona effect is the temperature and the ionisation of the air surrounding the component to be protected. As the temperature of the air increases it is highly ionised and there will be more possibilities for the corona effect to occur. By means of forming a surrounding figure by means of a primary filiform element 10 wound upon itself a discrete surrounding allowing the passage of air through it and therefore its renewal in the space comprised between the component to be protected and the device 1 to occur. A consequence of this effect is that the increase of the temperature surrounding the component to be protected is prevented.

Figure 1A:
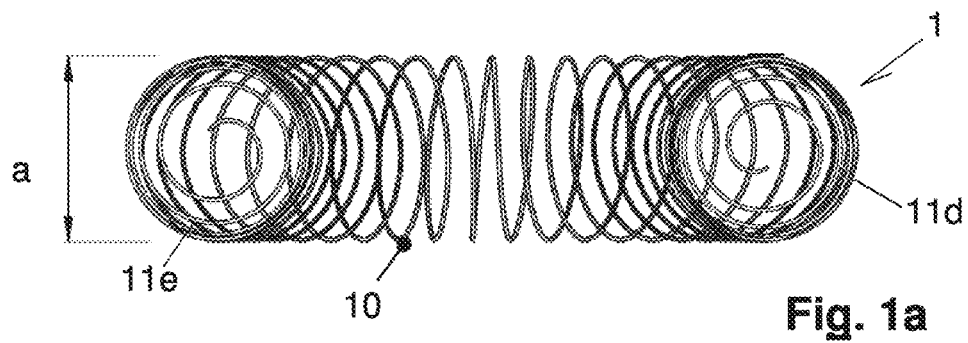
FIGS. 1a, 1b and 1c are respective elevational side view, plan view and perspective view of a first variant of a device according to the invention.
Figure 1B:
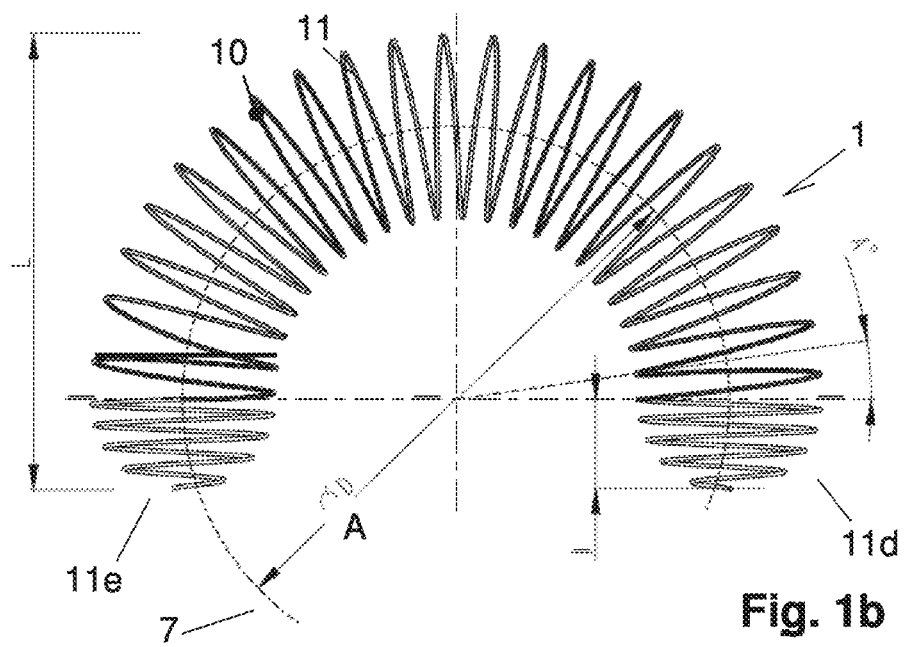
Figure 1C:
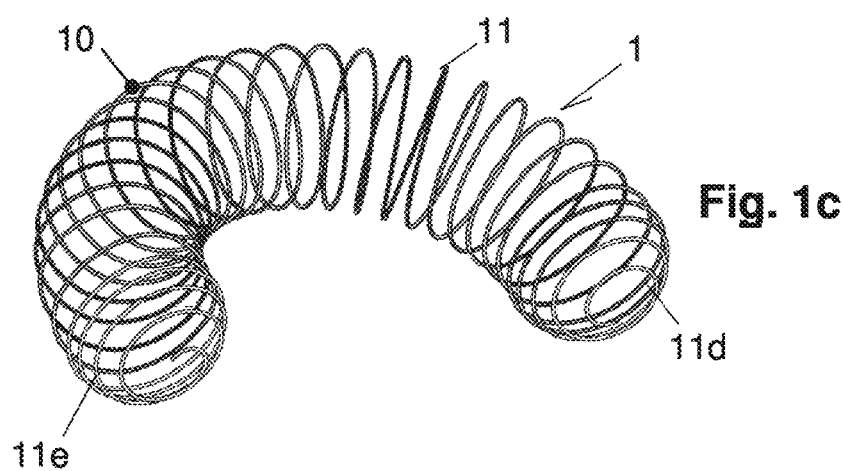

Relating to the different shapes which can be adopted by the helix formed by the main section 11 of the primary filiform element 10, in the variant of FIGS. 1a, 1b and 1c the mentioned primary filiform element 10 is spirally wound around a curved axis 7, in the example circular and having a diameter A of approximately 1500 mm, forming a toroidal helix.

The mentioned main section 11 comprises a central segment of constant height a and two end segments 11d, 11e shaped like a semispherical helix. In this example the length L of the semispherical helix is 250 mm; the value L is approximately 1250 mm.

Figure 2A:
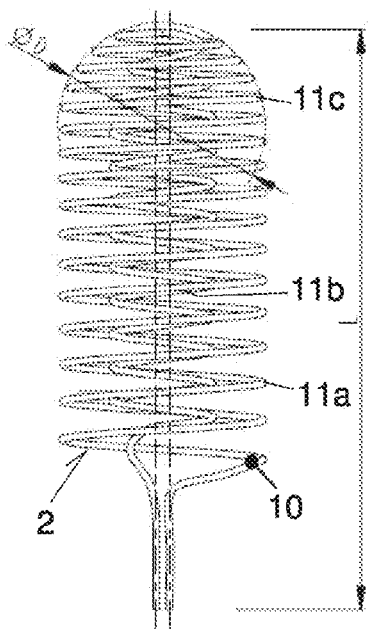
FIGS. 2a, 2b and 2c are respective elevational side view, perspective view and plan view of a second variant of the device according to the invention.
Figure 2B:
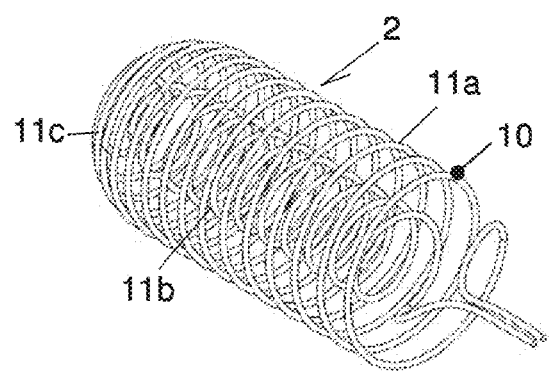
Figure 2C:
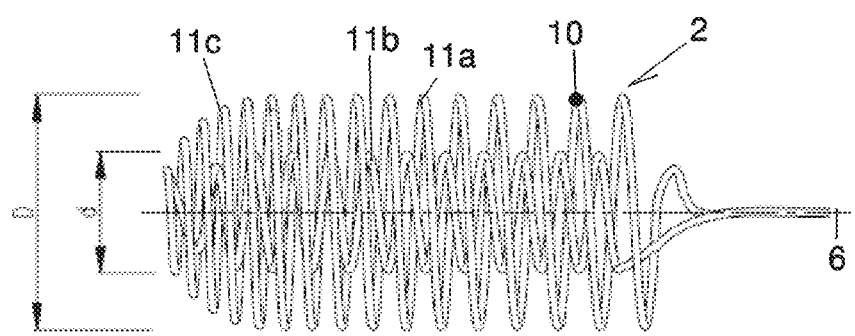

In the variant of FIGS. 2a, 2b and 2c, the device 2 has a shape similar to a bulb and it can be seen that the main section 11 comprises a first cylindrical helix segment 11a having diameter D of about 500 mm; a second cylindrical helix segment 11b having diameter d of approximately 300 mm which is housed inside the first segment 11a; and a linking segment 11c shaped like a semispherical helix of diameter D, the relation D>d being met. The ends of the primary filiform element 10 prolong like straight pins in a direction parallel to the straight axis 6. In this example the length L of the device 2 is about 850 mm.

Figure 3A:
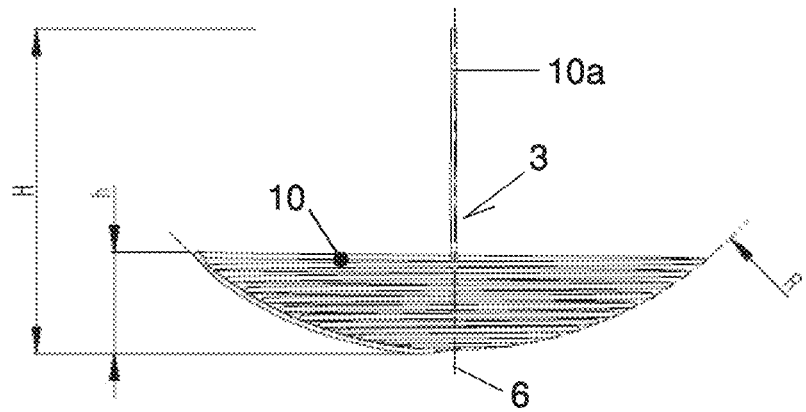
FIGS. 3a, 3b and 3c are respective elevational side view, perspective view and plan view of a device according to a third variant of the invention.
Figure 3B:
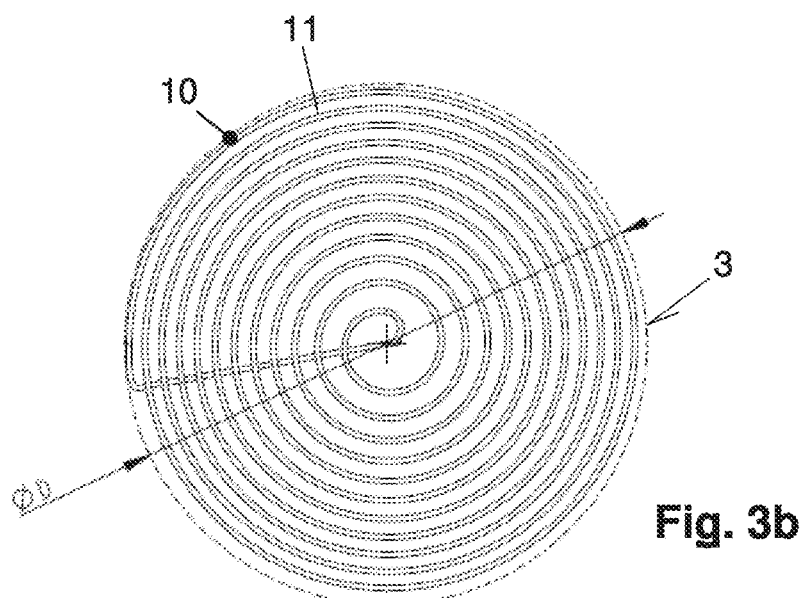
Figure 3C:
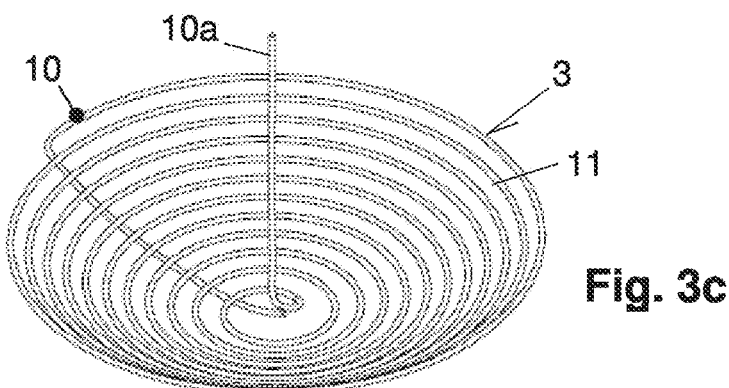

In the variant of FIGS. 3a, 3b and 3c, the device 3 has a shape similar to an umbrella, and it can be seen that a main section 11 of the primary filiform element 10 is spirally wound around a straight axis 6 forming a helix which in plan view has a uniform spiral shape and which confers a spherical cap shape having radius R of approximately 750 mm and height h of 200 mm to this part of the device 3.

In this variant, the primary filiform element 10 comprises a straight end section 10a coinciding with the straight axis of rotation 6 of the spiral, providing the device with a shape similar to an umbrella and a total height H of about 600 mm.

Figure 5A:
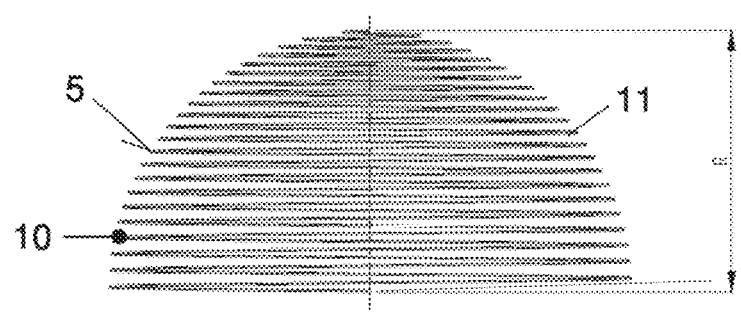
FIGS. 5a, 5b and 5c are respective elevational side view, plan view and perspective view of a device according to a fifth embodiment variant.
Figure 5B:
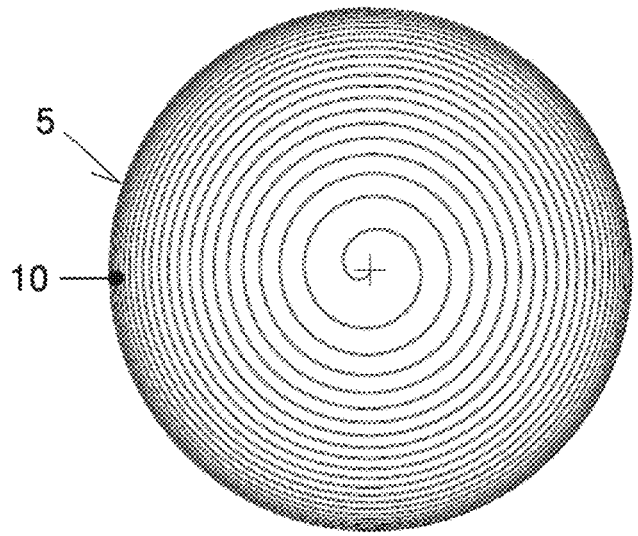
Figure 5C:
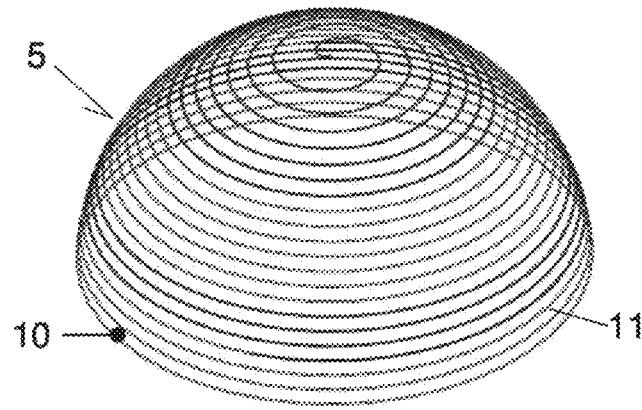

The variant of FIGS. 5a, 5b and 5c are similar, but the device 5 is configured in the shape of a semispherical helix having radius R of about 500 mm.

Figure 4A:
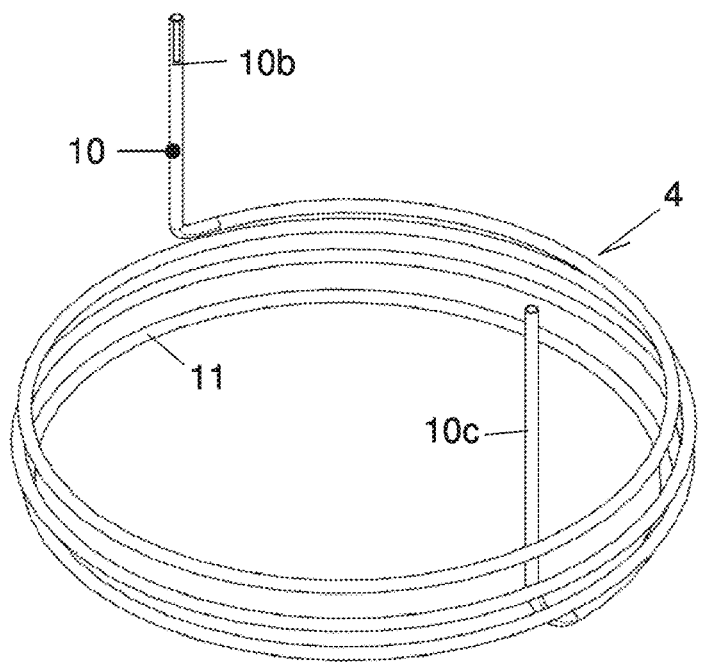
FIGS. 4a and 4b are respective perspective view and elevational view of a device according to a fourth variant of the invention.
Figure 4B:
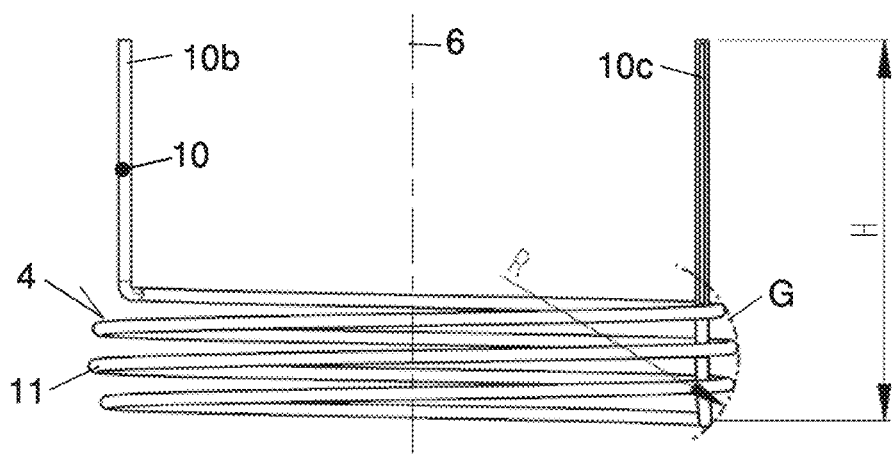

In terms of the variant of FIGS. 4a and 4b, the main section forms a helix around a straight axis 6 but said helix is not straight, its radius varying according to the axial direction, the helix being inscribed in a body of revolution with curved generatrix G of constant radius R, the height H of this exemplary variant being 300 mm.

In this variant, the primary filiform element 10 comprises respective straight end sections 10b, 10c, prolonging opposite each other in one and the same direction parallel to the straight axis 6.

Figure 6:
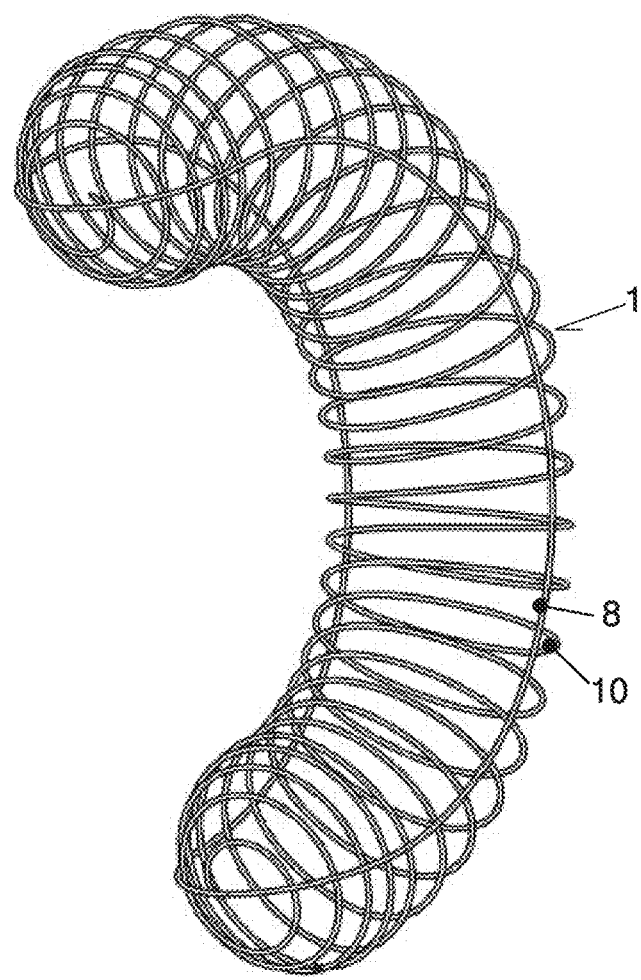
FIG. 6 is a variant of a device comprising a secondary auxiliary filiform element with structural functions.

In order to keep the passage of the winding of the primary filiform element 10 constant, and to ultimately prevent altering the shape of the surrounding figure forming the mentioned winding, providing the device with one or more secondary structural filiform elements 8 shorter than the primary filiform element 10, preferably arranged transverse to the direction of the mentioned primary filiform element 10, is contemplated. To illustrate this solution FIG. 6 shows the variant of the device according to FIG. 1 provided with a merely structural secondary filiform element 8 the function of which is to prevent toroid deformation. Incorporating a structural element of this type is determined by the diameter and the material of the main filiform element 10. The greater the stiffness of this main filiform element 10 the lesser the need to provide a secondary filiform element for retaining the shape of the surrounding figure characterizing the device.

The invention claimed is:

1. A device for minimising corona effect at a connection point between conductor tubes of an electrical sub-station, comprising an electrically conductive primary filiform element wound upon itself forming a surrounding figure suitable for housing or surrounding the connection point at least partially; the primary filiform element comprising a main section that is spirally wound around a straight axis, the main section comprising a first cylindrical helix segment of diameter D wound around the straight axis; and a second cylindrical helix segment of diameter d wound around the straight axis and housed inside the first cylindrical helix segment.

2. The device according to claim 1, further comprising one or more structural secondary filiform elements shorter than the primary filiform element and arranged transverse to a main direction of the primary filiform element for keeping the passage of the winding constant.

3. The device according to claim 1, further comprising a linking segment having a semispherical-like helix shape of diameter D; and wherein D is greater than d.

4. The device according to claim 1, further comprising one or more structural secondary filiform elements shorter than the primary filiform element and arranged transverse to a main direction of the primary filiform element for keeping the passage of the winding constant.

5. An electrical sub-station, comprising buses and at least one of a suspension point or a connection point between the buses, and the device according to claim 1; wherein the device at least partially houses or surrounds the suspension point or the connection point between the buses.

6. A device for minimising corona effect at a connection point between conductor tubes of an electrical sub-station, comprising an electrically conductive primary filiform element wound upon itself forming a surrounding figure suitable for housing or surrounding the connection point at least partially, the primary filiform element comprising a main section having in plan view a uniform or Archimedean spiral shape about a straight axis in which a distance on the spiral to the straight axis varies proportionally to an angle of rotation, forming a semispherical or a spherical cap-shaped helix.

7. The device according to claim 6, wherein the primary filiform element comprises a straight end section coinciding with the straight axis of rotation of the spiral, providing the device with a shape similar to an umbrella.

8. The device according to claim 6, further comprising one or more structural secondary filiform elements shorter than the primary filiform element and arranged transverse to the main direction of the mentioned primary filiform element for keeping the passage of the winding constant.

9. An electrical sub-station, comprising buses and at least one of a suspension point or a connection point between the buses, and the device according to claim 6; wherein the device at least partially houses or surrounds the suspension point or the connection point between the buses.

10. A device for minimising corona effect at a connection point between conductor tubes of an electrical sub-station, comprising an electrically conductive primary filiform element wound upon itself forming a surrounding figure suitable for housing or surrounding the connection point at least partially, and wherein a main section of the primary filiform element is spirally wound around a straight axis forming a helix, the helix being inscribed in a body of revolution with curved generatrix G of constant radius R.

11. The device according to claim 10, wherein the primary filiform element comprises respective straight end sections prolonging in one and the same direction parallel to the straight axis.

12. The device according to claim 10, further comprising one or more structural secondary filiform elements shorter than the primary filiform element and arranged transverse to the main direction of the mentioned primary filiform element for keeping the passage of the winding constant.

13. An electrical sub-station, comprising buses and at least one of a suspension point or a connection point between the buses, and the device according to claim 6; wherein the device at least partially houses or surrounds the suspension point or the connection point between the buses.

14. A device for minimising corona effect at a connection point between conductor tubes of an electrical sub-station, comprising an electrically conductive primary filiform element wound upon itself forming a surrounding figure suitable for housing or surrounding the connection point at least partially, a main section of the primary filiform element spirally wound around a curved axis forming a toroidal helix, the main section comprising two end segments each shaped like a semispherical helix.

15. The device according to claim 14, further comprising one or more structural secondary filiform elements shorter than the primary filiform element and arranged transverse to the main direction of the mentioned primary filiform element for keeping the passage of the winding constant.

16. An electrical sub-station, comprising buses and at least one of a suspension point or a connection point between the buses, and the device according to claim 14; wherein the device at least partially houses or surrounds the suspension point or the connection point between the buses.

* * * * *